United States Patent [19]

Wright

[11] Patent Number: 5,339,530
[45] Date of Patent: Aug. 23, 1994

[54] HAND LEVEL INSTRUMENT WITH COMPOSITE METAL AND PLASTIC BODY

[76] Inventor: Randall J. Wright, 2000 Moraine End, Delafield, Wis. 53018

[21] Appl. No.: 16,115

[22] Filed: Feb. 9, 1993

[51] Int. Cl.⁵ .............................................. G01B 7/14
[52] U.S. Cl. ...................................... 33/427; 33/379; 33/464; 33/451
[58] Field of Search .............. 33/379, 480, 482, 464, 33/451, 474, 427

[56] References Cited

U.S. PATENT DOCUMENTS

| | | | |
|---|---|---|---|
| 2,122,875 | 7/1938 | Witchger | 33/427 X |
| 3,921,306 | 11/1975 | Provi | 33/379 |
| 4,125,490 | 11/1978 | Hettinga | 33/379 X |
| 4,757,615 | 7/1988 | Cecil | 33/379 |

FOREIGN PATENT DOCUMENTS

| | | | |
|---|---|---|---|
| 0489955 | 6/1992 | European Pat. Off. | 33/379 |
| 3407583 | 10/1984 | Fed. Rep. of Germany | 33/379 |
| 2146769 | 4/1985 | United Kingdom | 33/384 |

Primary Examiner—William A. Cuchlinski, Jr.
Assistant Examiner—Alvin Wirthlin
Attorney, Agent, or Firm—Jones, Day, Reavis & Pogue

[57] ABSTRACT

A hand tool usable as a combination square having a precalibrated angle measuring vial and enhanced tensile strength, comprising a composite metal and plastic body, wherein a frame, including the working surfaces of the tool, is made from metal for precision and long-term durability, and the remainder of the body, including critical interactive portions of the tool, is made from an injection molded plastic matrix and the method of manufacture. The molded matrix is retained by frame elements providing blade support in cooperation with the frame, structure for a blade retaining means and structure for vial mounting.

8 Claims, 3 Drawing Sheets

HAND LEVEL INSTRUMENT WITH COMPOSITE METAL AND PLASTIC BODY

BACKGROUND OF THE INVENTION

The present invention relates generally to hand level instruments having bubble vials mounted thereto, and more specifically to such a hand level instrument for which the various working surfaces are made from metal, while the remainder of the body, including critical interactive portions of the tool, is made from injection molded plastic.

Hand level instruments like combination squares provide a versatile tool for the craftsman. Formed from a plurality of parts, they commonly provide a blade having a ruled surface for measuring linear distances and scribing straight lines, a handle which interacts with the blade to define 90° and 45° angles, and a bubble vial mounted in the handle portion thereof to define an angled relationship between the surface of the handle and a workpiece.

Traditionally, such combination squares have been made from metal, having a die-cast handle portion formed from zinc. While such an all-metal tool is rugged and provides metal working surfaces for scribing, it is relatively heavy. Moreover, casting metal in a die is a relatively expensive process, particularly where close tolerances are required, thereby adding the high costs associated with the die to the cost of the metal material, itself.

As an alternative, manufacturers have resorted to combination squares made entirely from plastic. While cheaper to manufacture, such squares are not as durable as ones made from metal, and do not provide metal working surfaces.

Efforts have been made to fashion hand level instruments from a composite of metal and plastic materials. For example, U.S. Pat. No. 3,921,306 issued to Provi discloses a carpenter's and mason's hand level having metal rails defining the corners (and therefore the work surfaces) of the level instrument joined by a metal cross web. Plastic material is injection molded around the cross web of the metal frame to complete a rectangular slab body for the tool. However, Provi uses the plastic filler material simply to reduce the amount of metal that must be used, and therefore the weight of the tool. No effort has been made to provide an integral, precision molded vial mounting for the bubble vial, nor is there any teaching regarding the use of a molded plastic matrix to provide precision interactive surfaces between the handle and blade portions of a combination square.

SUMMARY OF THE INVENTION

Accordingly, it is an object of the present invention to provide a combination square construction, employing a metal blade and a metal frame for the handle portion thereof, which surrounds an interior matrix made from a molded structural core material.

Another object of the present invention is to provide such an apparatus in which the molded plastic interior matrix provides an integral vial mounting, retention surfaces for mounting the blade to the handle, and a cavity for a fastening bolt therefore.

Yet another object of the present invention is to provide such an apparatus in which a bubble vial may be inserted into the integral molded vial mounting without the need to retain or calibrate it in a separate step.

Still another object of the present invention is to provide such an apparatus having working surfaces for measuring and scribing operations made from metal.

Yet another object of the present invention is to provide such an apparatus of reduced weight, enhanced tensile strength, and cost-effective assembly.

Other objects of the invention, in addition to those set forth above, will become apparent to those skilled in the art from the following disclosure.

Briefly, the invention is directed to providing a hand level instrument with a composite metal and plastic body, wherein a frame, including the working surfaces of the tool, is made from metal for precision and long-term durability, and the remainder of the body, including critical interactive portions of the tool, is made from an injection molded plastic matrix. The plastic matrix is retained by the metal frame, and forms at least one integral vial retention holder. The vial is simply press fit into the vial retention holder for secure and precalibrated alignment with a measuring surface along the tool. The construction of the present invention may be directed to a combination square or any other type of hand level instrument.

DETAILED DESCRIPTION OF THE PREFERRED EMBODIMENT

Figure 1:
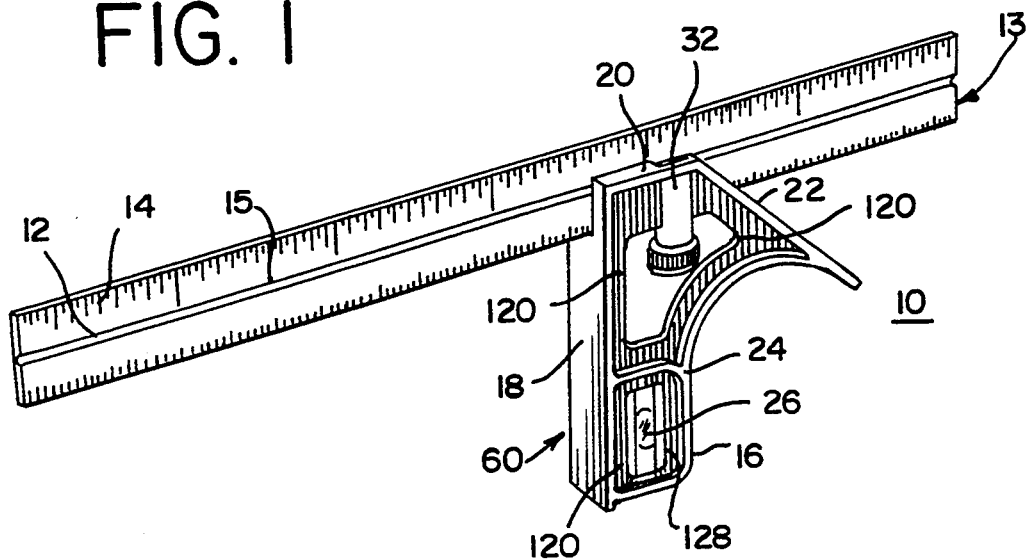
FIG. 1 shows a perspective view of a combination square.

As illustrated in FIG. 1 of the drawings, the combination square 10 includes a flat blade 12. Along the edges of the flat surface faces of the blade are inscribed or otherwise marked demarcation indicators 14 so that the combination square may be used as a measuring and straight-edge instrument. Running down the middle of blade 12 is machined a groove 15. Handle 16 is designed with vertical face 18, horizontal face 20, and 45-degree face 22. The vertical and 45-degree faces coordinate with the lower edge of blade 12 to form 90 and 45-degree angles, respectively, so that the combination square may function as a try square or angle square. Handle 16 also has hand grip surface 24, which is suitable for conformity with the human hand. Finally, handle 16 comes equipped with bubble vial 26, which allows the combination square to indicate degree of level or plumb.

Figure 3:
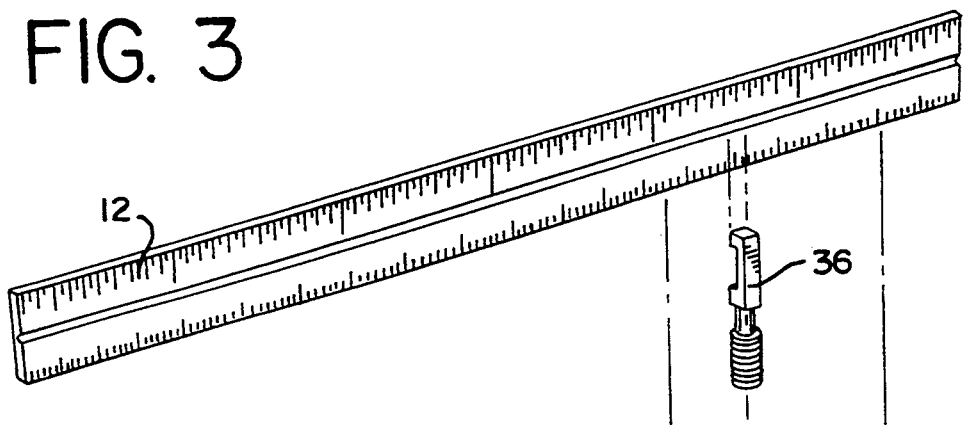
FIG. 3 shows the combination square of FIG. 1 in its disassembled state.

Within the upper portion of handle 16 is cut vertical groove 28, which terminates in bottom face 29 (most easily seen in FIG. 3). Interrupting vertical groove 28 is square channel 30, which also runs vertically from horizontal surface 20 of the handle down to lower face 29. Below lower face 29 is formed cylindrical channel 32, which penetrates through handle 16 to open area 34.

Figure 2:
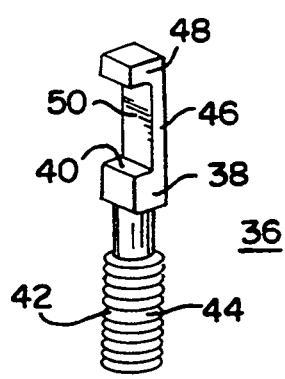
FIG. 2 shows a perspective view of the fastener clip of the combination square depicted in FIG. 1.

A side profile of fastener clip 36 is illustrated in FIG. 2. It comprises cubic base 38 with top face 40. Projecting from the bottom of base 38 is cylindrical protrusion 42, having screw threads 44 spirally circumscribed about its outer surface. Projecting upwards from cubic base 38 is stem 46, terminating in lip 48. Stem 46 also bears face 50.

Assembly of combination square 10 is depicted in FIG. 3. Fastener clip 36 is inserted into handle 16 so that cylindrical protrusion 42 extends into open portion 34 of the handle, and face 40 of cubic base 38 is relatively flush with bottom face 29 of vertical groove 28. Blade 12 may then be inserted into and slid through vertical groove 28 of handle 16 so that groove 15 mates with lip 48 of fastener clip 36. Finally, spring 52 is positioned around cylindrical protrusion 42 of fastener clip 36 and nut 54 is tightably engaged with screw threads 44 so that a rigid combination square 10 results.

Figure 4:
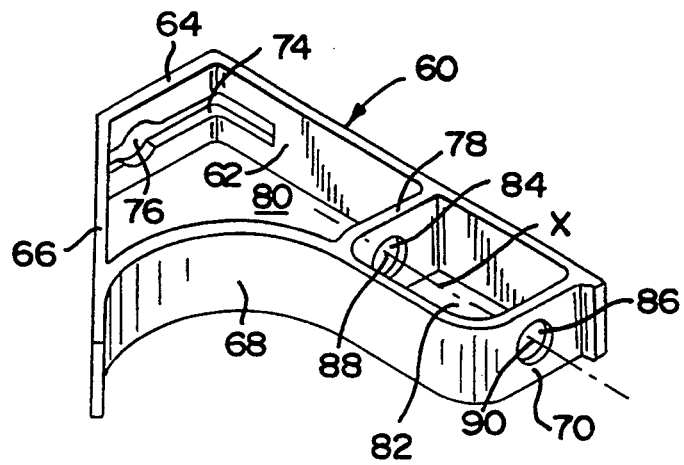
FIG. 4 shows a perspective view of the metal frame forming the perimeter of the handle portion of the combination square of FIG. 1.

The present invention is directed to the structure of handle 16 of combination square 10. As shown in FIG. 3, it is made from a combination of metal and plastic wherein the plastic regions have been shaded. The frame portion 60 of handle 16 is shown in FIG. 4. Extruded from a suitable metallic material like aluminum, it features a plurality of interconnected portions—namely, vertical section 62, top section 64, angled section 66, curved section 68, and bottom section 70. Vertical section 62, top section 64, angled section 66, and curved section 68 correspond to vertical face 18, horizontal face 20, 45-degree angle face 22, and grip surface 24 of handle 16 shown in FIG. 3. By frame 60 providing the exterior profile of handle 16, the work surfaces of combination square 10 are made from metal for durability and long-term accuracy. Cut through the face of top section 64, vertical section 62, and angled section 66 of frame 60 is groove 74. A hole 76 is bored through a portion of groove 74 in top section 64.

A cross web 78 is formed between vertical section 62 and curved section 68 during the extrusion process of metal frame 60. The cross web divides metal frame 60 into an upper region 80 and a lower region 82, and contributes to the strength of frame 60, thereby allowing it to be made from a light-weight metal of reduced tensile strength. Mating holes 84 and 86 are bored through cross web 78 and bottom section 70 having center points 88 and 90, which lie on an axis X which is generally parallel to vertical section 62 of metal frame 60.

Figure 5:
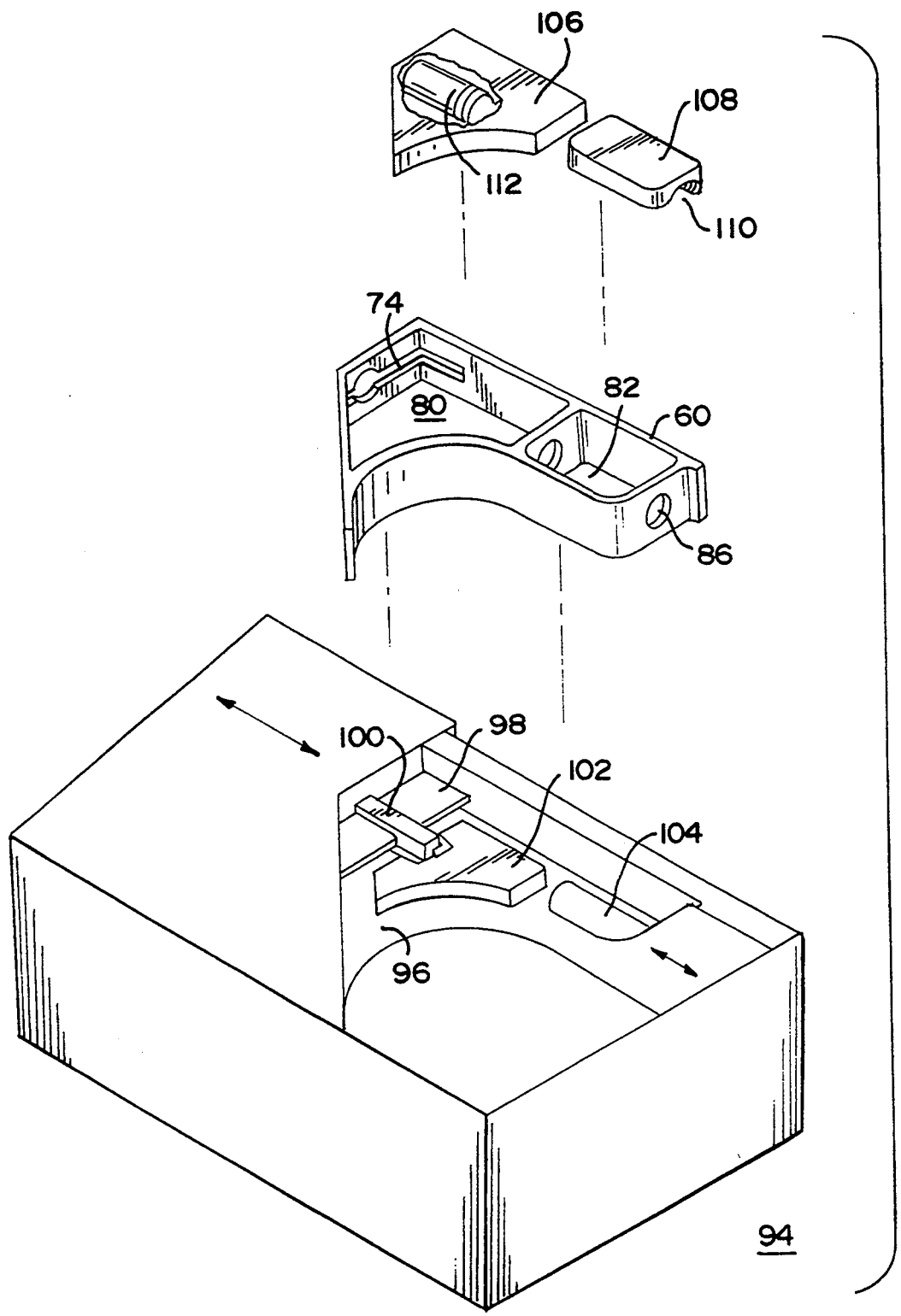
FIG. 5 shows a mold used in injection molding the plastic matrix of the combination square of FIG. 1.

Next, the finished frame 60 is placed in mold 94, as illustrated in FIG. 5. Inside the box-like mold is a chamber 96 having a perimeter that corresponds with the exterior shape and dimensions of metal frame 60. Connected to the side wall at one end of the mold in chamber 96 is plate 98 to which is interconnected barrel 100 and wedge 102. Interconnected to the other end of mold 94 is barrel 104. After metal frame 60 is slid into the mold so that plate 98 is positioned inside groove 74 and barrel 104 intersects hole 86, caps 106 and 108 are inserted into upper region 80 and lower region 82, respectively, of the frame. The bottom face of cap 108 features a cylindrically grooved region 110. A cutaway region of cap 106 likewise shows a cylindrically grooved surface 112 on the lower face thereof. Molds corresponding to the shape and dimensions of caps 106 and 108 are built into the bottom of chamber 96.

Figure 6:
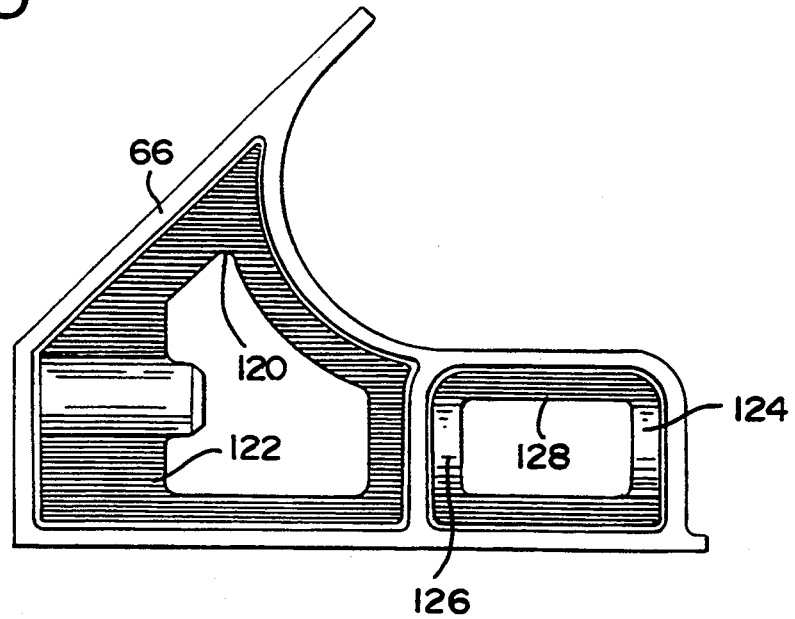
FIG. 6 shows a side view of the handle portion of the combination square of FIG. 1.

Then a plastic material is injected into mold 94 and therefore into chamber 96. The metal frame 60 and surfaces of mold 94 cooperate to form the plastic matrices 120 and 128 shown in FIGS. 1 and 3, and more directly in FIG. 6. More particularly, frame 60, cap 106, plate 98, barrel 100, and wedge 102 cooperate to form plastic matrix 122 of handle 16 having vertical groove 28 for accepting blade 12, square channel 30 and cylindrical channel 32 for accommodating fastener clip 36, and opening 80 for accommodating nut 54 and an operator's index finger. Cap 108, frame 60, and barrel 104 in turn cooperate to form plastic matrix 128, having opening 82 for accommodating bubble vial 26, and an annular passage or ringwall 124 and pocket 126 for retaining the ends of the bubble vial. A plug 130 may be inserted into passage 124 to seal it after the bubble vial has been inserted into matrix 128.

Instead of inserting the metal frame into the plastic matrix, as done by Provi, applicant has used the metal frame 60 as an outsert which acts as a mold cavity during the injection molding process, and defines the outer configuration of the handle 16. Two different injection molding techniques may be used. In high-pressure injection molding, plastic materials like acrylonitrile-butadiene-styrene (ABS), high-impact polystyrene (HIPS), super-high-impact polystyrene (SHIPS), or polycarbonate may be injected at approximately 440° F. for HIPS, SHIPS, and ABS to approximately 550° F. for polycarbonate into the mold regulated at 60°–120° F. Each of these materials could be further blended with mineral fillers to enhance various product properties, during the cooling cycle of the injection molding process, including the relative shrinkage properties of the aluminum and plastic resin in order to reduce the inherent gap between the plastic matrix and aluminum extrusion. A typical cycle time for molding the product by high-pressure injection molding is 35–40 seconds.

These same plastic resins could also be used with either a thermoplastic structural foam molding process in which the resin is combined with a foaming agent (either physical or chemical) to produce a plastic matrix having a closed-cell internal structure with a solid skin, or with a gas-assisted structural foam molding process in which an inert gas (usually, but not necessarily, nitrogen) is injected directly into the molten plastic resin after an initial and carefully prescribed amount of molten resin has first been injected into the mold, thereby resulting in a hollow molding similar to the well-known blow-molding process used to produce items like bottles, hollow toys, etc.

While the cycle time for structural foam injection molding is 55–60 seconds, these processes enjoy several advantages over conventional high-pressure injection molding, including savings in plastic resin materials, and an ease in processing with minimal distortion of the aluminum extrusion as a result of the low injection pressures used, when compared with those for high-pressure injection molding. One disadvantage of the structural foam process using a foaming agent is a slightly longer cycle time caused by the foam structure's higher thermal conductivity, resulting in slower cooling to the ejection temperature. However, this process can be used to produce compensating cost benefits by allowing high reprocessed percentages without substantially reducing physical properties of the product.

In this manner, a combination square made from composite materials may be quickly and easily made, having a plastic matrix which provides precise tolerances for securing the bubble vial in prealigned orientation without the need for a calibration step, and the blade securely fastened to and oriented with the handle. The plastic injection molding process provides a lighter weight tool when compared with one made entirely from metal, reduces the production costs associated with die casting metal objects have precise tolerances, and saves on the costs of materials. At the same time, the benefits associated with metal working surfaces are retained.

A coloring agent may be added to the plastic matrix during the injection molding process not only for cosmetic purposes, but also to provide a good visual contrast with the color of the solution in the bubble vial.

While particular embodiments of the invention have been shown and described, it should be understood that the invention is not limited thereto, since many modifications may be made. For instance, the composite design of the combination square could be easily applied to other tools like a hand level, while obtaining similar advantages. Therefore, the invention is contemplated to cover by the present application any and all such modifications which fall within the true spirit and scope of the basic underlying principles disclosed and claimed herein.

What is claimed is:

1. A hand tool with a cylindrical bubble vial mounted therein comprising:
   (a) a structurally rigid metal frame perimeter having a plurality of interconnected sides having a coplanar top face and a coplanar bottom face, and an open passageway therebetween, a face of one of said sides comprising a measuring surface;
   (b) an aperture bored through a face of one of the sides of said frame;
   (c) injection molded plastic mechanically trapped within at least a portion of said passageway defined by bottom faces of said frame, said injected plastic providing structural and dimensional surfaces extended into a portion of said passageway, and not extending beyond the top and bottom faces of the frame to create an integral vial mounting means oriented with respect to said aperture for retaining the vial;
   (d) said frame comprises the handle portion of a combination square;
   (e) said frame further comprises a groove recessed in a direction normal to a plurality of contiguous sides of said frame for accommodating the blade portion of a combination square, an aperture being bored through the bottom face of said groove to accept retaining means for securing the blade to the handle; and
   (f) wherein injection molded plastic is trapped by the interior lateral surfaces of said sides of said frame to provide structural and dimensional surfaces extending into a portion of said passageway to create an integral mounting for said retaining means for securing the blade to the handle.

2. A level instrument as recited in claim 1, wherein said retaining means comprises a clip at a first end for engaging the blade, and threads at a second end for securing said retaining means to the handle in cooperation with an associated nut.

3. A method for constructing a hand tool with a cylindrical measuring vial mounted therein, comprising:
   (a) extruding from metal a frame having multiple sides defining an external perimeter including a coplanar top face and a coplanar bottom face, and an open passageway passing therebetween, a lateral face of at least one of said sides comprising a measuring surface;
   (b) boring an aperture through a lateral face of one of the sides of said frame;
   (c) placing said frame in a mold having interior surfaces specially dimensioned to generally contain the open regions of said frame, while providing a structural and dimensional form for a vial mounting;
   (d) injecting plastic material into the open passageway defined by the lateral interior surfaces of said frame, said plastic material being transported between the cooperative surfaces of the mold and frame to provide an integral vial mounting in said passageway, said vial mounting having a viewing window having an annular pocket at one end and an annular ringwall at the other end, said packet and ringwall having centerpoints located along a common axis with the centerpoint of said aperture within said lateral surface of said frame, said axis being parallel to said measuring surface;
   (e) sliding the vial through said aperture into said viewing window, whereby the end portions thereof are securely retained by the pocket and ringwall, and the vial is precisely oriented with respect to said measuring surface of said frame without additional retention or calibration means;
   (f) inserting a plug into said vial insertion aperture after the vial is inserted therethrough into said viewing window; and
   (g) cutting a groove into a plurality of contiguous lateral surfaces of said frame, and a channel through the bottom face of said groove into said open passageway, said injection molded plastic being transported within said groove and channel between the side walls thereof and the mold to form a precisely oriented and dimensioned passageway for slidable receipt of a blade of a combination square and fastening means for securing the blade to the composite handle formed from the metal frame and plastic material trapped therein.

4. A hand tool with a cylindrical bubble vial mounted therein comprising:
   (a) a structurally rigid metal frame perimeter having a plurality of interconnected sides having a coplanar top face and a coplanar bottom face, and an open passageway therebetween, a face of one of said sides comprising a measuring surface;
   (b) an aperture bored through a face of one of the sides of said frame;
   (c) injection molded plastic mechanically trapped within at least a portion of said passageway defined by bottom faces of said frame, said injected plastic providing structural and dimensional surfaces extended into a portion of said passageway, and not extending beyond the top and bottom faces of the frame to create an integral vial mounting means oriented with respect to said aperture for retaining the vial;
   (d) said frame comprises the handle portion of a combination square;
   (e) said frame further comprises a groove recessed in a direction normal to a plurality of contiguous sides of said frame for accommodating the blade portion of a combination square, an aperture being bored through the bottom face of said groove to accept retaining means for securing the blade to the handle;
   (f) wherein injection molded plastic is trapped by the interior lateral surfaces of said sides of said frame to provide structural and dimensional surfaces extending into a portion of said passageway to create an integral mounting for said retaining means for securing the blade to the handle; and (g) further comprising injection molded plastic trapped within said groove for forming a grooved channel and cylindrical passageway for providing precisely dimensioned structural support for the surfaces of the blade and said retaining means.

5. A hand tool comprising;

(a) a rigid metallic frame having a plurality of interconnected sections having opposed inner and outer faces, the inner section faces defining an open area and the outer section faces forming a gripping means;

(b) plastic material injection molded into at least a portion of the open area and mechanically retained by the sections to increase the rigidity of the frame;

(c) at least one of the interconnected sections being provided with an opening through the opposed faces for receipt of a measuring blade movable therein relative to the gripping means;

(d) the opening including structure cooperable with an adjustable blade retaining means to hold the blade in one or more selected positions relative to the retaining means;

(e) the plastic material injection molded into the open area including integral mounting structure cooperable with the opening structure for retention of the blade retaining means; and (f) blade retaining means operably connected to the mounting structure to provide selective positioning of a measuring blade relative to the frame.

6. The hand tool of claim 5 wherein the plastic material is molded into the opening and flush with the outer face of the section bordering the opening to provide opposed plastic supporting surfaces for a measuring blade disposed slidably in the opening and in operable relation to the blade retaining means.

7. The hand tool of claim 5 wherein the blade retaining means comprises a clip projecting from the outer face of the section bordering the opening and having a first end for engaging a blade and retaining it in a selected position, and a second threaded end inserted into the integral mounting structure of the blade retaining means for manual operation of the retaining means.

8. The hand tool of claim 5 wherein the plastic material is molded to create an integral vial mounting means in the open area and oriented in a predetermined position with respect to the blade retaining means.

* * * * *